March 15, 1966  J. J. CARRONA  3,240,977
ELECTRON TUBES

Filed June 7, 1962  2 Sheets-Sheet 1

INVENTOR.
JOHN J. CARRONA
BY
William A. Zalesak
Attorney

March 15, 1966 J. J. CARRONA 3,240,977
ELECTRON TUBES
Filed June 7, 1962 2 Sheets-Sheet 2
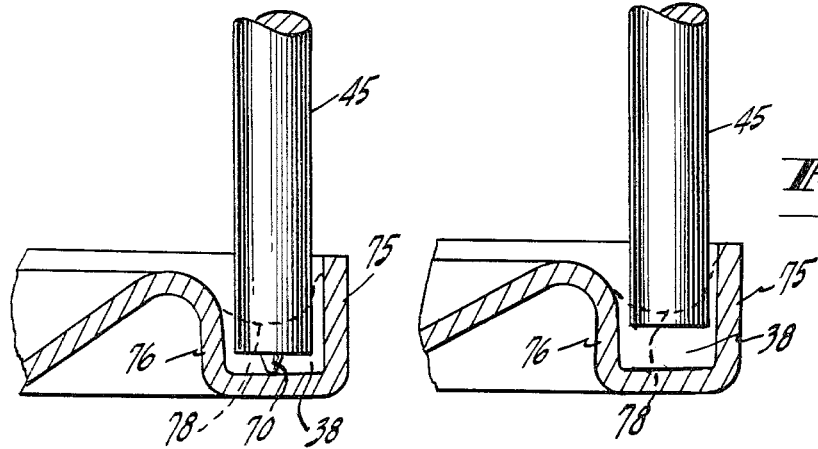
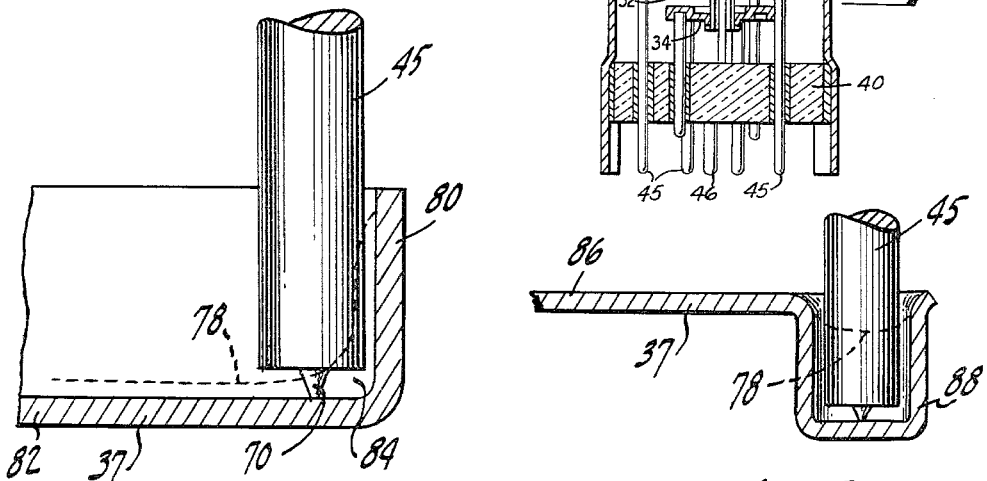
INVENTOR.
JOHN J. CARRONA
BY
William A. Zalesak
Attorney

United States Patent Office 3,240,977
Patented Mar. 15, 1966

1

3,240,977
ELECTRON TUBES
John J. Carrona, Scotch Plains, N.J., assignor to Radio Corporation of America, a corporation of Delaware
Filed June 7, 1962, Ser. No. 200,832
3 Claims. (Cl. 313—238)

This invention relates to electron discharge tubes and to an improved tube structure for brazing together the electrodes and electrode support assemblies of electron tubes.

In the fabrication of one type of electron tube hereinafter described, it is the practice to braze the tube electrodes to electrode support elements secured to a header wafer closing one end of the tube envelope. The tube electrodes may comprise a plurality of concentric tubular members each having fixed to one end thereof an electrode support flange. Each flange is formed with a central tubular portion adapted to receive an end portion of an electrode to be supported thereby, and a peripheral, shallow, concave trough. A plurality of support and coductive lead-ins are provided which extend through bores in the wafer and into contact with the flanges, the ends of the lead-ins being received within the flange troughs. The flanges may be clad or otherwise provided with a suitable brazing material. The flanges and lead-ins are made of materials which are wettable by the brazing material and the walls of the wafer bore are coated with a material which is also wettable by the brazing material.

The method of assembling such an electron tube involves the use of a jig adapted to receive and support individual tube parts. The jig has means for receiving successively, in vertical position, the tubular electrodes in suitably spaced relation. Each electrode and its flange may be loaded simultaneously or the flanges may be loaded separately to engage the upper ends of the electrodes with the ends of the electrodes received within the tubular portions of the flange with the flange troughs opening upwardly. The header wafer is loaded into the jig in parallel spaced relation with the flanges. The support lead-ins are passed through the wafer bores and into engagement with the flange troughs.

The jig with the loaded parts therein is then placed in a heated oven for melting the brazing material provided on the flanges. The molten brazing material flows along the flanges and contacts the electrode ends received within the flange tubular portions and the lead-in ends received within the flange troughs. Due to the wettability of the lead-ins the brazing material flows up the lead-ins and into the wafer bores. In this manner the electrodes and lead-ins are brazed to the flanges and the lead-ins are brazed to the header wafer and sealed vacuum tight therein.

One problem associated with the structure of the prior art type of tubes described is that in some instances the brazing material on the flanges did not make proper contact with the lead-ins whereby the brazing material neither wets nor flows along the lead-ins. As will be described hereinafter, such improper contact may be caused by the presence of tiny slivers of metal extending from the cut ends of the lead-ins which prevent full contact of the lead-in ends with the flanges. It has been found that the small gap thus created between the ends of the lead-ins and the flanges prevents proper contact of the brazing material with the lead-ins whereby flow of the brazing

2 material to and along the lead-ins is prevented. A further cause of improper contact of the brazing material with the lead-ins is the non-uniform thermal expansions of the different tube and jig parts. As will also be described hereinafter, such differential thermal expansions often cause the lead-ins to be lifted out of contact with the flanges. The gaps caused thereby also prevent proper parts brazing.

A further problem associated with the prior art structures is that upon heating and later cooling of the loaded jigs it is often found that the flanges have become warped and distorted. A cause of this is, that upon heating, the brazing material flows and coats the flanges with a strongly adherent layer of brazing material. The flange material and the brazing material layer have different coefficients of thermal contraction, and, upon cooling, the difference in rates of contraction induce bending stresses in the flanges which cause them to become distorted. Since the tube electrodes are mounted on the flanges, the effect of such flange distortion is to cause tilting of the electrodes and undesirable random changes in the spacings of the tube electrodes.

A still further problem associated with the prior art tubes is that prior to brazing slight vibration or jarring of the loaded jigs during normal handling thereof would often cause the lead-ins resting on the flanges to fall off the flanges and into the jig. The shallow troughs in which the lead-ins are received offers little restraint to lateral movement of the lead-ins, hence, even small accelerations were enough to jolt the lead-ins off the flanges. Repositioning the lead-ins onto the proper flanges is a delicate and time-consuming task. Also, the lead-ins often fall off the flanges during brazing and cause shorts to adjacent electrodes.

Therefore, it is an object of this invention to provide an improved electron tube of the type described wherein the above problems are avoided.

Particularly, objects of this invention are to provide an improved electron tube structure wherein contact and wetting of the lead-ins by the brazing material is provided even when the lead-ins do not fully contact the flanges; wherein distortion and warping of the flanges is avoided; and wherein the lead-ins resting on the flanges are prevented from being jarred therefrom during normal handling of the loaded jig.

For achieving these objects in accordance with this invention, electron tubes of the type described are provided having improved flanges. The flanges are provided with lead-in receiving portions which include wall or lip portions which extend substantially parallel to and closely adjacent the lead-ins extending between the wafer and the flanges. Further, the wall portions are located on the flanges so as to be positioned between the outer edge of the flanges and the lead-ins to provide a barrier for preventing the lead-ins from falling off the flanges. As will be described hereinafter, the improved flanges promote the formation of bridges of brazing material capable of spanning small gaps between the lead-ins and the flanges for providing flow of brazing material therebetween. Further, such improved flanges provide greater flange strength for resisting warping and bending of the flanges caused by the differential thermal contraction between the flange layers.

In the drawings:

FIGS. 5 and 6 are views similar to FIGS. 3 and 4 but showing a flange which may be used in a tube embodying the present invention;

FIGS. 7 and 8 are views similar to FIGS. 5 and 6 but showing further embodiments of flanges which may be used in tubes embodying the present invention; and FIG. 9 is a side elevation partly broken away, of an electron tube embodying the present invention.

Figure 1:
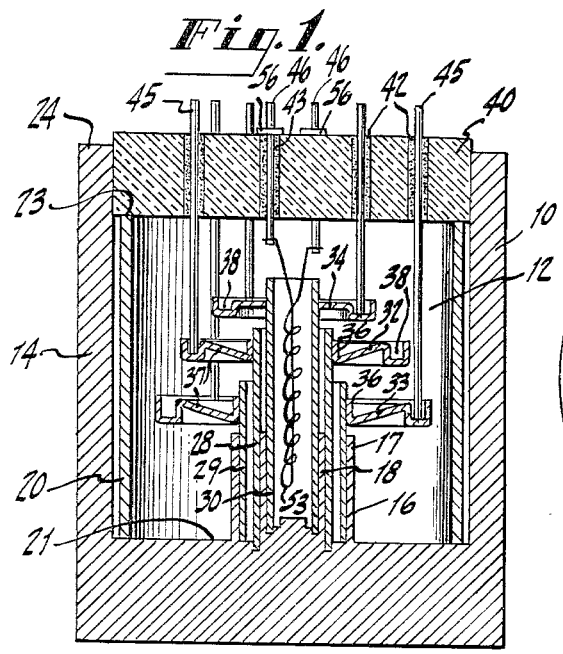
FIG. 1 is a longitudinal section of a brazing jig containing assembled parts of a mount for an electron tube embodying this invention.
Figure 2:
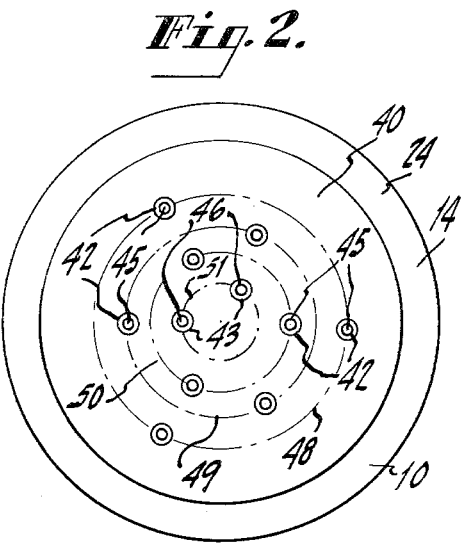
FIG. 2 is a top plan view of FIG. 1.

In FIGS. 1 and 2 is shown an assembly and brazing jig 10 containing assembled parts of a tube mount 12. Jig 10 comprises a cup-shaped shell 14 having a centrally disposed jigging assembly 16 comprising coaxial jigging cylinders 17 and 18. A circular insert 20 resting on the bottom 21 of jig 10 provides a ledge 23 within the jig adjacent the open end 24 thereof. The purpose of the jig is to provide exact relative positioning of the tube parts prior to brazing.

The tube mount 12 assembled within jig 10 comprises tubular electrodes 28 and 29 which may be grid and anode electrodes and a tubular electrode support 30 for supporting a cathode sleeve for example, received snugly within or around the jigging cylinders 17 and 18. Mounted on the ends of the tubular electrodes 28 and 29 and support 30 are electrode support flanges 32, 33 and 34. Each flange comprises a centrally disposed tubular portion 36, a radially extending portion 37, and a peripheral trough 38 having a U-shaped cross section. Mounted on the ledge 23 provided by insert 20 is a header wafer 40 having bores 42 and 43 therethrough.

Support and conductive rod-like lead-ins 45 extend through the bores 42 and into engagement with the flanges, the ends of the lead-ins being received within the troughs 38. As shown in FIG. 2, the bores 42, and hence lead-ins 45 are arranged in three concentric circles 48, 49 and 50 shown in phantom. Three bores are disposed in 120° equidistant relation on each of the circles. The bores in adjacent circles are angularly displaced 60° to provide maximum spacing therebetween. Two lead-ins 46 are provided extending through bores 43 on circle 51 for a heater element 53 received within tubular electrode support 30.

In one embodiment, by way of example, flanges 32, 33 34 are made of steel, the conductive lead-ins 45 and 46 are made of molybdenum, and header wafer 40 is made of a ceramic material such as forsterite. The brazing material for providing the brazed joints between the electrodes and the flanges, the lead-ins 45 and the flanges, and the lead-ins 46 and the wafer 40 may be provided as a cladding of copper on each of the flanges. Rings 56 of brazing material are provided on lead-ins 46 for brazing these lead-ins to wafer 40. Brazing material rings (not shown) may be provided on each of the lead-ins 45 supplementary to or in place of the copper cladding on the flanges. In order that the copper readily wet the lead-ins 45 and 46 and the walls of the wafer bores 42 and 43, the molybdenum lead-ins are coated with iron, and in some instances, a further coating of copper, and the walls of the bores may be provided with a double coating comprising iron on molybdenum.

The method of assembly of mount 12 involves loading the electrode support 30 and tubular electrodes 28 and 29 within the jigging assembly 16 in vertical spaced apart orientation, mounting the support flanges 32, 33 and 34 on the ends of the tubular electrodes and electrode support 29, 28 and 30, respectively, and inserting the header wafer 40 into jig 10 and onto ledge 23 to maintain it in spaced parallel relation with the flanges. Prior to the loading of wafer 40, the heater 53 is secured to the two lead-ins 46 extending through bores 43 in the wafer, the heater 53 thus being inserted within electrode support 30 upon the loading of the wafer into the jig 10. Lead-ins 45 then dropped through the remaining bores 42 in wafer 40. The wafer bores 42 are carefully prelocated in the wafer and because of the exact relative positioning of the mount parts provided by the jig, the lead-ins 45 drop directly into the peripheral troughs 38 of the flanges 32, 33 and 34.

The loaded jig is then heated in a hydrogen furnace to melt and cause the brazing material to flow. The molten brazing material provided on the flanges flows along the flanges and into contact with the end of the electrodes 28 or 29 or the electrode support 30 received within the flange tubular portions 36 and into the peripheral troughs 38. Within the troughs 38 the brazing material forms puddles which thoroughly contact and wet the ends of the lead-ins received therein. The brazing material then flows up the lead-ins and into the wafer bores 42. Also, the brazing material rings 56 on lead-ins 46 and the brazing material rings on lead-ins 45, if provided, melt and flow down the lead-ins into wafer bores 43 and 44, respectively. Upon cooling, the brazing material hardens to form brazed joints between the electrodes 28 and 29 and electrode support 30 and the flanges 32, 33 and 34, respectively, between the lead-ins 45 and the flanges, and between the lead-ins 45 and 46 and the wafer 40.

A finished electron tube 90 (FIG. 9) may be made from the mount by removing the brazed mount 12 from the jig 10, placing a sleeve 92 containing an electron emissive material over tubular electrode support 30, and fitting a cup-shaped envelope shell 94 over the mount and in contact with the periphery of header wafer 40. A source of solder is positioned between the envelope tube shell and the wafer periphery. This assembly results in a complete tube assembly which is then subjected to a final furnace heating in vacuum. This final processing step serves to evacuate the tube, sinter the electron emissive sleeve to the tubular electrode support 30, and solder the envelope shell to the periphery of the header wafer 40. The temperature employed in this final step is substantially below the previous brazing temperature. Accordingly, the previously made brazes are not adversely affected.

As mentioned, one problem encountered in the prior art method of fabrication is that often, due to improper contact of the tube lead-ins with the flanges, the molten brazing material does not contact the lead-ins, hence, does not run therealong to provide the necessary brazed joints.

Figure 3:
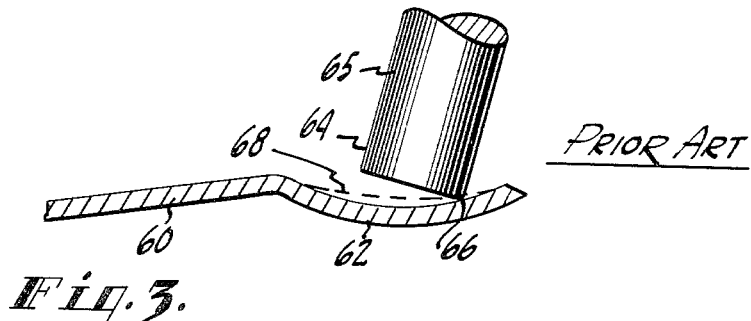
FIGS. 3 and 4 are partial views in section of a prior art flange and a lead-in engaged therewith during brazing.
Figure 4:
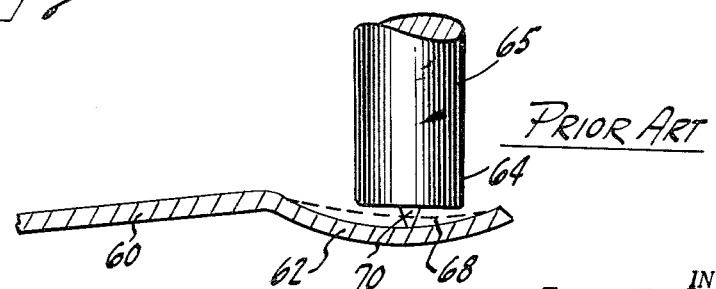

Two causes of such improper lead-in-to-flange contact using prior art flanges are illustrated in FIGS. 3 and 4. As shown, the prior art flanges 60 are provided with shallow concave troughs 62 in which the ends 64 of the lead-ins 65 are received. In one such prior art flange, by way of example, having a diameter of 314 mils, the trough 62 has a maximum width of 26 mils and a depth of 13 mils. The lead-ins 65 have a diameter of 15.5 mils. In FIG. 3, a condition is illustrated wherein the lead-in 65 is slightly cocked or tilted with respect to the flange 60. Such condition may result from a slight jarring of the mount prior to brazing whereby either the flange or the lead-in, or both, may be slightly jarred out of position. As shown, only an edge 66 of a lead-in actually contacts the flange 60. Upon heating, the molten brazing material forms a shallow pool within the trough 62, as indicated by the dash line 68, and contacts the lead-in 65 only at edge 66. Although the reasons are not fully understood, it has been observed that for the condition illustrated in FIG. 3 the brazing material contacting the edge 66 of the lead-in 65 frequently will not flow from the flange trough to and up the lead-in.

As shown in FIG. 4, a similar result may arise from the presence of a tiny sliver 70 extending outwardly from the lower end of lead-in 65, such slivers frequently occurring upon the cutting of molybdenum wire, as known. The slivers have a small cross sectional area and do not provide sufficient contact with the brazing material to permit flow of the brazing material up the sliver and along the lead-in.

Further, although not shown, a condition may arise wherein the end of the lead-in is lifted completely out of contact with the flange, such condition arising, it is believed, as a result of the different thermal expansions of the mount and jig parts. In some instances the lead-ins become tacked or sintered to the header wafer before full brazing temperature is reached and before the lead-ins are secured to the flanges. Upon further increase of temperature one electrode may expand more than the others thereby raising its flange and the lead-ins engaged therewith a distance greater than the other flanges and lead-ins are raised by their corresponding electrodes. Since the lead-ins are tacked to the wafer, the wafer is also raised, thereby lifting all the other lead-ins away from their respective flanges.

As shown in FIGS. 1, 5 and 6, according to one embodiment of the invention, the flanges 32, 33 and 34 are provided with deep U-shaped troughs 38 having side walls 75 and 76 which extend substantially parallel to the lead-ins contained therein. For a flange having a diameter of 314 mils, by way of example, the trough 38 has a width of 20 mils and a depth of 20 mils. Upon melting, the brazing material flows from other parts of the flange and forms a deep pool in the trough 38 as indicated by dash line 78 in FIGS. 5 and 6. The reason why the brazing material collects in the trough is because of the forces of surface tension in the liquid brazing material which cause the brazing material to collect within a space having the smallest possible surface area. It has been observed that the formation of the deep pool is sufficient to span the gap created either by the presence of a tiny sliver 70 (FIG. 5) or by the thermal differential expansion of the mount and jig parts (FIG. 6).

A condition comparable to that shown in FIG. 3 is not shown since the provision of the deep trough makes the occurrence of such a condition very unlikely. That is, upon assembly of the mount 12, as mentioned, the lead-ins 45 are dropped squarely in place within the flange troughs. Once received within the troughs 38 of the flanges 32, 33 or 34, the walls 75 and 76 thereof serve to prevent relative tilting of the lead-ins with respect to the flanges upon jarring of the mount.

A further cause tending to promote adequate contact of the brazing material with the lead-ins in the arrangement of FIGS. 5 and 6 is the effect of capillary pressure. That is, with a trough 38 having a width of 20 mils, and a lead-in 45 having a diameter of 15.5 mils, the maximum gap between the lead-in 45 and either of the trough walls 75 or 76 extending substantially parallel thereto is 2.25 mils. Capillary pressure is dependent upon the materials involved, and for a system using molten copper, iron plated molybdenum wires, and steel walls, such gap of 2.25 mils is small enough to provide a capillary spacing in which the molten copper will rise.

FIG. 7 illustrates a variation from the flanges shown in FIGS. 5 and 6, the flange 82 having only a single wall or peripheral lip 80 which extends substantially parallel to a lead-in 45 engaging the flange 82. The flange 82 is dimensioned so that the lead-in engages the flange closely adjacent the lip during assembly of the mount, whereby a capillary spacing is provided between the lead-in 45 and the lip 80. Hence, as described above, the brazing material is induced to flow along the lead-in. Further, as shown, the brazing material forms a relatively deep pool or meniscus 84 at the juncture of the lip 80 and the flange radial portion 37. As known, the depth of such a meniscus is greatest adjacent a right angle bend, and as illustrated, is sufficiently deep to bridge the gap created by a sliver 70.

A still further variation of the flanges is shown in FIG. 8, the flange 86 being provided with peripheral wells or pockets 88 spaced about the circumference of the flange. In addition to having the pool forming and capillary action advantages of the flanges described above, this flange has the added advantages of providing full peripheral contact of the lead-ins with the flanges, thereby providing greater brazing material contact therewith, while also preventing movement of the lead-ins in all lateral directions.

A further problem of the prior art tubes is that the flanges were found to have little resistance to bending stresses caused by the differential thermal contraction of the different flange layers. That is, although the central tubular portions of the flanges provide strength in a direction parallel to the flange axis in the region adjacent the center of the flanges, the shallow peripheral troughs add little strength and resistance to bending stresses adjacent the periphery of the flanges. Hence, the flanges would often become warped and distorted. The flanges of the present invention, however, as illustrated in FIGS. 1, 5, 6, 7 and 8 have peripheral portions including wall or lip sections which extend parallel to the axis of the flanges. Such portions provide adequate strength at the flange peripheries to withstand the bending stresses caused by the different rates of thermal contraction. Accordingly, tubes made using the improved flanges illustrated have been found to have more consistent and uniform electrical characteristics due to avoidance of warping of the flanges and the attendant tilting of the tube electrodes.

The third problem mentioned with respect to the prior tubes, namely, that of the jarring of the lead-ins off the flanges, has already been referred to. That is, by providing wall sections extending parallel to the lead-ins and located between the edge of the flange and the lead-in, jarring of the lead-ins off the flanges is avoided.

In summary, tubes made according to this invention include flanges having wall or lip portions which extend substantially parallel to the axis of the flanges, hence, substantially parallel to the lead-ins engaging the flanges. The flange walls, either individually, or in connection with adjacent walls, permit the formation of pools of brazing material deep enough to bridge small gaps between the ends of the lead-ins and the flange surface. Also, the walls in connection with the lead-ins provide capillary spacings in which the brazing material may rise. Further, the walls serve as barriers for preventing the lead-ins from falling off the flanges, and in addition, provide greater strength to the flanges for withstanding bending stresses.

What is claimed is:

1. An electron tube comprising an insulating wafer having a plurality of openings therethrough, a plurality of parallel rod-like members extending into said openings and fixed to the walls thereof, said rod-like members extending from one face of said wafer and having ends spaced from said wafer, a flange support, said flange support having a continuous wall around the periphery thereof, said wall extending parallel to said rod-like members and closely adjacent thereto, said rod-like members being positioned within said wall and brazed thereto, and an elongated electrode fixed at one end to said flange support.

2. An electron tube having an insulating wafer having a plurality of openings therethrough, a plurality of parallel rod-like conducting members extending into said openings and fixed to the walls thereof, said rod-like conducting members extending from one face of said wafer and having ends spaced from said wafer, a flange support, said flange support having a continuous trough of U-shaped cross section at the periphery of said support, said trough having a wall extending parallel to said rod-like members and closely adjacent thereto, said rod-like members being positioned within said trough and closely adjacent said wall and brazed thereto, and an elongated electrode fixed at one end to said flange support.

3. A sub-assembly for an electron discharge device comprising a tubular electrode, an annular flange mounted on an end of said electrode and coaxial therewith, a header wafer mounted parallel to and coaxial with said flange, and a plurality of lead-ins extending between said wafer and said flange, said flange having a source of brazing material thereon, and said flange having a continuous U-shaped trough at the periphery of said flange in which the ends of said lead-ins are relatively snugly received, whereby upon heating of said mount said brazing material collects in said trough and contacts said lead-ins.

References Cited by the Examiner

UNITED STATES PATENTS

| 2,424,528 | 7/1947 | Wild | 339—220 |
| 3,101,428 | 8/1963 | Griffin | 313—252 |

FOREIGN PATENTS 63,892    9/1945    Denmark.

JOHN W. HUCKERT, *Primary Examiner.*

JAMES D. KALLAM, *Examiner.*